United States Patent
Schippl et al.

(10) Patent No.: US 6,732,765 B2
(45) Date of Patent: May 11, 2004

(54) PIPELINE FOR THE TRANSPORT OF REFRIGERATED MEDIA

(75) Inventors: Klaus Schippl, Hannover (DE); Stephan Lange, Wedemark (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/385,703

(22) Filed: Mar. 12, 2003

(65) Prior Publication Data

US 2003/0178080 A1 Sep. 25, 2003

(30) Foreign Application Priority Data

Mar. 13, 2002 (DE) .......................... 102 11 074

(51) Int. Cl.[7] .................................. F16L 9/18
(52) U.S. Cl. .................. 138/112; 138/121; 138/143; 138/148; 138/149
(58) Field of Search ................ 138/112, 149, 138/121, 122, 171, 143, 144, 148

(56) References Cited

U.S. PATENT DOCUMENTS

| | | | | |
|---|---|---|---|---|
| 2,167,538 A | * | 7/1939 | Turk | 174/28 |
| 3,565,118 A | * | 2/1971 | Stearns | 138/112 |
| 3,595,275 A | * | 7/1971 | Steans et al. | 138/114 |
| 3,595,982 A | * | 7/1971 | Kafka | 174/15.5 |
| 3,619,474 A | * | 11/1971 | Beck | 174/19 |
| 3,861,022 A | * | 1/1975 | Hildebrandt et al. | 29/455.1 |
| 4,121,623 A | * | 10/1978 | Rhone | 138/114 |
| 4,380,253 A | * | 4/1983 | Mead et al. | 138/149 |
| 4,570,679 A | * | 2/1986 | Schippl | 138/149 |
| 4,984,605 A | * | 1/1991 | Schippl | 138/149 |
| 6,186,181 B1 | * | 2/2001 | Schippl | 138/112 |

* cited by examiner

*Primary Examiner*—James Hook
(74) *Attorney, Agent, or Firm*—Sughrue Mion, PLLC

(57) ABSTRACT

A pipeline for the transport of refrigerated media, including at least two metal pipes, positioned concentrically and at a distance to one another, an insulating layer made of layers of insulating material and reflecting material alternately positioned over one another being provided in the ring gap between the metal pipes and the ring gap being evacuated and a spacer in the form of a helix being wound onto the inner pipe. The spacer (3) is a metal wire (3a), onto which bodies (3b) made of a mechanically resistive insulating material, which are provided with a hole, are threaded at specific intervals. The layers (4b) made of insulating material are made of nonwoven glass or ceramic

10 Claims, 1 Drawing Sheet

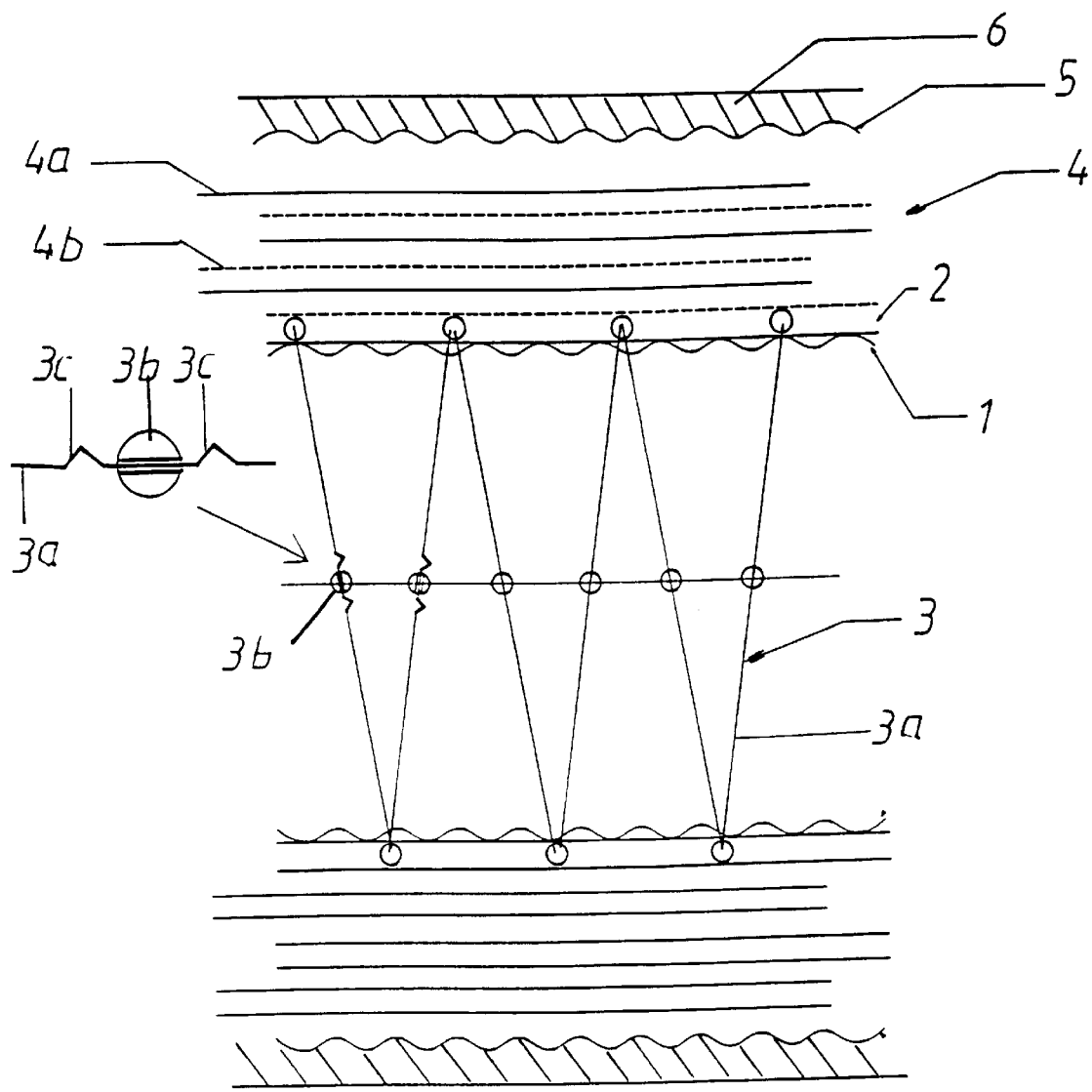

PIPELINE FOR THE TRANSPORT OF REFRIGERATED MEDIA

This application is based on and claims the benefit of German Patent Application No. 10211074.3 filed Mar. 13, 2002, which is incorporated by reference herein.

BACKGROUND OF THE INVENTION

The present invention relates to a pipeline for the transport of refrigerated media.

A pipeline for the transport of refrigerated media, which comprises two corrugated metal pipes, positioned concentrically and at an interval to one another, is known from European Patent Application 0 326 923 A. In such a pipeline, a superinsulator, wound in a helix, made of alternate layers of metal films or metallized plastic films and insulating material positioned on top of one another, are provided in the ring gap between the metal pipes and held in a vacuum.

In order to accelerate the evacuation procedure, a ring gap is provided between the inner pipe and the superinsulator layer, the ring gap formed by a spacer, wound on the inner pipe in a helix, which comprises single strands made of plastic which are braided together.

The advantages of the known pipeline are particularly that lengths of more than 20 m may be evacuated rapidly, and compressions of the superinsulator as a consequence of load pressures of the inner pipe remain restricted to the smallest possible region. Through the improved evacuation, expensive superinsulator material may be dispensed with while keeping the same insulation value, and thus the external diameter of the pipeline may be reduced.

The disadvantage of this known pipe construction is that, due to the proportion of plastics in the thermal insulation, the pipeline cannot withstand higher temperatures over a longer period of time. Thus, for example, in the production of an outer shell through extrusion of a thermoplastic, temperatures of up to 300° C. arise on the outer surface of the pipeline. This leads to temperatures of up to 120° C. on the inner pipe, so that the insulating material, e.g., metallized plastic films or spacers made of plastic, soften and are no longer able to fulfill their desired function. Incidence of heat on the inner pipe from the outside is possible because during manufacturing the ring gap is not yet evacuated.

SUMMARY OF THE INVENTION

The present invention is based on the object of improving the known pipeline in such a way that the pipeline, even if the ring gap is not yet evacuated, may withstand temperatures of over 300° C., without parts of the insulating layer losing their desired function. In addition, contact of the inner pipe and outer pipe is to be avoided.

This object is achieved by the a pipeline wherein the spacer (3) is a metal wire (3a), onto which bodies (3b) made of a mechanically resistive insulating material, which are provided with a hole, are threaded at specific intervals and the layers (4b) made of insulating material comprise a nonwoven glass or ceramic.

Further advantageous embodiments of the present invention are described below and in the appended claims.

BRIEF DESCRIPTION OF THE DRAWINGS

The present invention is described in more detail with reference to a single FIGURE schematically illustrating an exemplary embodiment.

DETAILED DESCRIPTION OF THE INVENTION

The inner pipe 1 is a corrugated metal pipe, welded with a straight bead, preferably made of stainless steel. A metal film 2, preferably also made of stainless steel, is wound onto the inner pipe 1 using overlapping strip edges. A spacer 3, which runs in the shape of a helix, and over which a superinsulator 4 is wound, lies on the metal film 2. The outer pipe 5 is also a corrugated metal pipe, welded with a straight bead, and is preferably made, like the inner pipe 1, from stainless steel. A plastic shell 6 is applied to the outer pipe 5 through extrusion of a thermoplastic, e.g., polyethylene, polypropylene, polyurethane, or another suitable plastic.

A superconductor (not shown) based on metal oxides (HT superconductor) is located in the inside of the inner pipe 1.

The superinsulator 4 comprises alternatingly applied films 4a made of metal, e.g., aluminum or stainless steel, and layers 4b made of a nonwoven glass or ceramic material. Approximately 30 layers of the film 4a and the layer 4b form the superinsulator layer 4.

The spacer 3 comprises a metal wire 3a, preferably a wire made of stainless steel, onto which multiple beads 3b are threaded, which are fixed on the metal wire 3a. Each bead 3b is fixed by bends 3c of the metal wire 3a before and after the bead 3b.

The length of lay, using which the spacer 3 is wound onto the inner pipe 1 and/or the layer made of metal film, is approximately 10 times the diameter of the bead.

The diameter of the beads and the spacing of the beads from one another is a function of the outer diameter of the inner pipe 1 which is wound with the metal film 2.

Thus, for example, the diameter of the beads is 5–15 mm. The spacing of the beads from one another is to be dimensioned in such a way to ensure that contact of inner pipe 1 and outer pipe 5 is avoided. The spacing of the beads to one another is advantageously 0.5 to 2 D, D being the outer diameter of inner pipe 1.

For example, a pipeline according to the teaching of the present invention has the following dimensions:

| | |
|---|---|
| Inner corrugated pipe | $D_i$ (inner diameter) = 39 mm |
| | $D_A$ (outer diameter) = 44 mm |
| Outer corrugated pipe | $D_i$ (inner diameter) = 60 mm |
| | $D_A$ (outer diameter) = 66 mm |
| Number of layers: 20 | |
| Bead diameter: 4 mm | |
| Bead spacing: 150 mm | |
| Length of lay of the spacer: 50 mm | |

What is claimed is:

1. A pipeline for the transport of refrigerated media, comprising at least two metal pipes, positioned concentrically and at an interval to one another, an insulating layer made of layers of insulating material and reflecting material alternately positioned over one another being provided in the ring gap between the metal pipes and the ring gap being evacuated, in which a spacer is wound onto the inner pipe in the shape of a helix, wherein the spacer is a metal wire, onto which bodies made of a mechanically resistive insulating material, which are provided with a hole, are threaded at specific intervals and the layers made of insulating material comprise a nonwoven glass or ceramic, and wherein the bodies are fixed by bending the metal wire before and after the bodies.

2. The pipeline according to claim 1, wherein the bodies are beads or spheres made of glass or ceramic.

3. The pipeline according to claim 2, wherein the diameter of the spheres or beads is 5–15 mm.

4. The pipeline according to claim 1, wherein the metal wire is a wire made of austenitic steel.

5. The pipeline according to claim 1, wherein the metal pipes are corrugated metal pipes welded along a straight bead.

6. The pipeline according to claim 5, wherein a layer of a reflecting metal film, preferably a film made of austenitic steel, is wound onto the corrugated inner pipe.

7. The pipeline according to claim 6, wherein the spacer is wound onto the layer of the reflecting metal film.

8. The pipeline according to claim 1, wherein the metal pipes are made of austenitic steel.

9. The pipeline according to claim 1, wherein the interval between the bodies is 0.5–2 D, D being the outer diameter of the inner pipe.

10. An enclosure for a high-temperature superconductor, comprising a pipeline according to claim 1.

* * * * *